United States Patent [19]

Steer

[11] Patent Number: 4,921,305
[45] Date of Patent: May 1, 1990

[54] WHEEL BARROW

[76] Inventor: Clive A. Steer, West View, Shere Rd., West Horsley, Leatherhead, Surrey, Great Britain

[21] Appl. No.: 256,201

[22] Filed: Oct. 11, 1988

Related U.S. Application Data

[63] Continuation of Ser. No. 734,863, Apr. 30, 1985, abandoned, which is a continuation of PCT GB84/00298 on Aug. 29, 1984, published as WO85/01024 on Mar. 14, 1985.

[30] Foreign Application Priority Data

Aug. 30, 1983 [GB] United Kingdom ............... 8323252

[51] Int. Cl.⁵ .............................................. B62B 01/18
[52] U.S. Cl. ..................................... 298/3; 280/47.31; 280/47.315; 414/338
[58] Field of Search ............... 280/47.3, 47.31, 47.36, 280/47.37 R, 653, 47.315, 47.371; 298/2, 3; 414/338, 490

[56] References Cited

U.S. PATENT DOCUMENTS

| 1,032,009 | 7/1912 | Long | 298/3 |
|---|---|---|---|
| 1,327,578 | 1/1920 | Vessey | |
| 2,544,505 | 3/1951 | Kronhaus | |
| 2,588,503 | 3/1952 | Dwyer | 298/3 |
| 4,471,996 | 9/1984 | Primeau | 298/3 |
| 4,632,461 | 12/1986 | Randolph | 298/2 |

FOREIGN PATENT DOCUMENTS

| 987266 | 4/1976 | Canada | 414/490 |
|---|---|---|---|
| 1332010 | 10/1973 | United Kingdom | 280/47.31 |

Primary Examiner—Robert J. Spar
Assistant Examiner—Janice Krizek
Attorney, Agent, or Firm—Banner, Birch, McKie & Beckett

[57] ABSTRACT

In a wheelbarrow having a bin (1) for the load, a ground wheel (2) at a front end of the bin and a handle (3) at a rear end, the handle (3) has a cam shaped extension (7) which forms a leg for the bin rear end and which is mounted on a pivot (4) carried on the bin. The handle (3) can be released from its normal position and then pivoted forward in the direction of the wheel (2). This action causes rotation of the cam and the bin rear end is lowered to near ground level to allow easy loading of the bin. When loaded the handle (3) can be returned to its position at the bin rear end and the cam simultaneously lifts the bin and load. The load may then be carried and emptied as with a conventional wheelbarrow.

8 Claims, 1 Drawing Sheet

WHEEL BARROW

CROSS REFERENCE TO RELATED APPLICATION

This application is a continuation of application Ser. No. 734,863, filed Apr. 30, 1985, now abandoned which is a continuation of PCT Application No. PCT/GB84/00298, filed on Aug. 29, 1984. This application was published Mar. 14, 1985 as International Publication WO85/01024.

This invention relates to wheelbarrows. In this specification, a wheelbarrow is considered to be a handbarrow having a single axis for the load-bearing ground wheels, a bin for the load, and means serving as handles.

The conventional wheelbarrow with a bin for the load, a single wheel mounted in front of this bin and two legs and two handles at the rear of the bin has remained unchanged for many years. This construction however is not an ideal one for many purposes since a wheelbarrow is frequently used in a garden, for example in moving loose material over rough ground from one site to another. While emptying the bin is a simple matter of tilting the barrow over its front wheel to allow the transported material to fall out, filling the bin requires the load material to be lifted from ground level to the rim of the bin and then dropped into the bin. By repeating this operation, the bin is gradually filled. When the load is judged to be sufficient, the handles are used to push the wheelbarrow with its load of material to the new site.

It is clear that a major proportion of the work involved in transporting the material takes place in the initial operation of loading the bin. If the material is to be transported over a level ground surface, little work is required for the moving of the barrow and in fact as the moving operation can be carried out when the user has his body in a reasonably erect position this is not a particularly tiring part of the operation.

In contrast to this, the operation of loading the bin requires the load material to be lifted from ground level by means of a shovel and the user thus has his body in a bent position which is an unsatisfactory attitude for the spine to adopt when trying to lift a weight. Since many shovel loads are required to fill the bin, the physical work required is substantial and this may lead to fatigue or a muscular strain in the back muscles.

It is an aim of the present invention to provide a wheelbarrow which can be used in a more efficient way than a conventional barrow and will thus be less tiring for the user. The mechanical operation of the present barrow is facilitated by the use of leverage so that filling the bin can be carried out without the need for the user to repeatedly lift quantities of the material to be transported.

One solution to this problem has been proposed in U.S. Pat. No. 4,349,210 which discloses an animal cart having two large ground wheels mounted on a pivoted handle. The handle is pivoted to the front end and the wheels are located at about halfway along the length of the cart. When the cart is in a stationary position, the rear end of the cart platform rests on the ground surface as shown in FIG. 6 of the patent. In this position, the handles may be unlatched and then pivoted towards the front of the cart which causes the front end of the cart platform to be lowered to ground level as shown in FIG. 7. Load material or a farm animal may then be moved onto the platform and the handle movement reversed to raise the front end and then enable the load to be transported. This construction is different from that about to be described since it has wheels located at about halfway along the length of the cart and it does not appear to be suitable for a design using only a single wheel.

According to the invention, there is provided a wheelbarrow having a bin for the load, a ground wheel at a front end of the bin, and a handle at a rear end of the bin. The handle is coupled to leg means arranged to support the bin at its rear end. The handle is attached to the bin by a pivot such that the handle can be secured at the rear end of the bin in a working condition of the wheelbarrow. The handle is movable on the pivot to an alternative position where the leg means are displaced causing the bin rear end to be lowered to near ground level to assist loading the bin. Subsequently moving the handle to its original position returns the legs to their normal height thereby raising the bin rear end to restore the wheelbarrow to its working condition.

In the working condition of the wheelbarrow, the handle may be secured by a releasable lock. The lock may be a pin which is attached to the handle and which may be passed through a hole in a frame supporting the bin. The frame may also provide means supporting the ground wheel.

The leg means may be in the shape of a cam having a periphery which is coupled to the pivot and the cam shape may be formed by a curved extension of the handle.

The bin rear end may carry a roller arranged such that when the bin rear end has been lowered to near ground level, the rear end will be supported on the roller with respect to the ground surface and the bin will then act as a movable scoop.

By way of example, particular embodiments of the invention will now be described with reference to the accompanying drawing in which.

Figure 1:
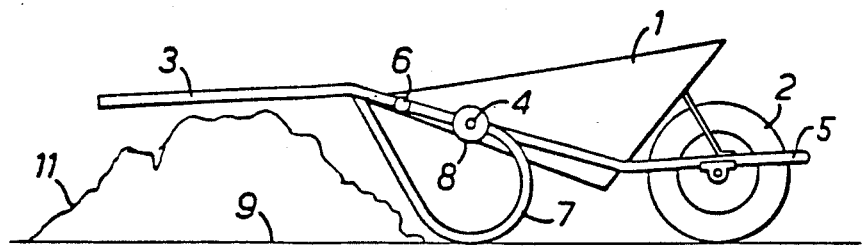
FIGS. 1–3 show a first embodiment of the wheelbarrow in side view.

The wheelbarrow shown in FIG. 1 has a bin 1 with a ground wheel 2 rigidly fixed at a front end thereof. The wheel 2 is mounted as usual on a shaft and this is carried in two end brackets that are attached to a frame 5 and the frame is secured to the bin 1 by nut and bolt fixings.

A rear end of the bin 1 is provided with a pair of handles 3 that are secured to the bin by pivots 4 that enable the handles to be moved in a plane parallel to that of FIG. 1. A bolt 6 on each handle 3 serves to lock the handle in a working position with respect to the bin although the bolts can release when required.

The pivots 4 are carried on the frame 5 and the bolts 6 in the locked position enter holes 6a (FIG. 2) in the frame 5. This arrangement ensures that the handles 3 and the frame 5 are securely fastened together in the working position of the wheelbarrow so that a strong and rigid construction is provided.

A lower part of each handle 3 has a loop portion 7 in the shape of a cam. The cam shape is formed by bending a curved extension of the handle and then welding the end of the metal tubing to an intermediate point along the length of the tubing to form the closed loop. An upper part of each loop portion 7 is mounted on the pivot 4 and the lower parts form leg means for supporting the rear end of the wheelbarrow.

Each pivot 4 has coaxially mounted therewith a small roller 8 the purpose of which will be described later.

As shown in FIG. 1, the wheelbarrow is depicted standing on a ground surface 9 and it is required to be loaded with loose material 11 forming a heap on the ground surface.

Figure 2:
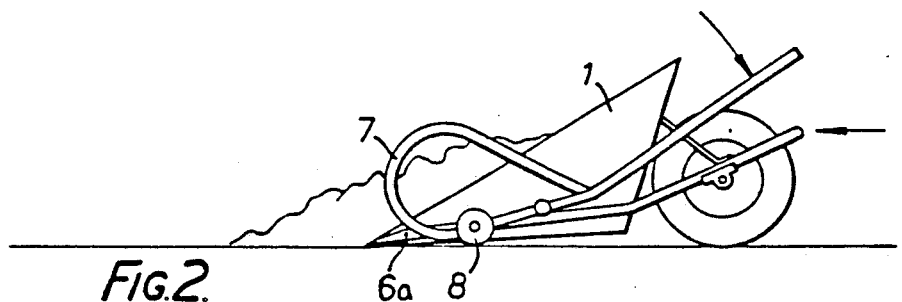

In operation of the wheelbarrow to load the loose material 11, the bolts 6 are released and the rear end of the bin 1 is then allowed to sink down between the loop portions 7 by manually raising the handles 3 through a vertical position until they lay alongside the wheel 2. This position is shown in FIG. 2. This movement of the handles causes the rear end of the bin 1 to come to rest in contact with or close to the ground surface 9 and the weight of the bin is carried on the two small rollers 8 so that the bin can move freely over the surface 9. In this position the bin is able to move easily over a smooth surface since it is supported by the two rollers 8 and the wheel 2.

Figure 3:
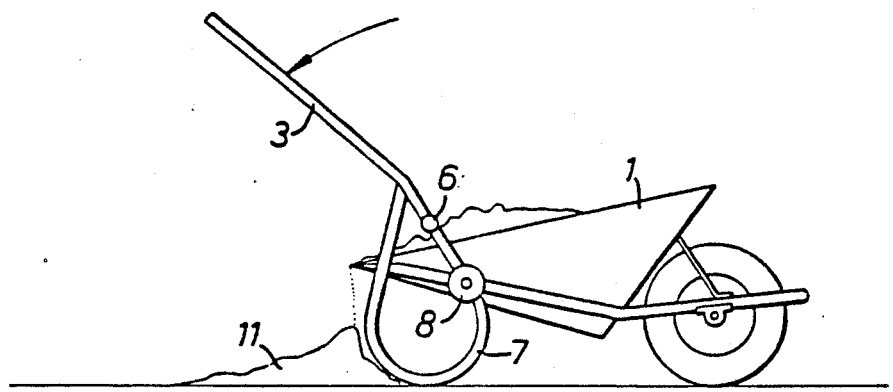

If the wheelbarrow is now pushed from the right hand side as shown in FIG. 2 the rear end of the bin will scoop into the loose material 11 on the ground surface and a useful quantity of the material is loaded into the bin 1. If required, further material may be pushed or swept into the bin to ensure that it is fully loaded. After loading is completed, the handles 3 are moved from their resting position over the wheel 2 back into the working position depicted in FIG. 1. An intermediate stage in this movement is shown in FIG. 3. Because of the leverage provided by the length of the handle this action is not difficult to carry out and the loop portions 7 are able to roll smoothly over the ground surface 9 and move the bin rear edge a little further in to the material 11 to give a good scooping action.

When the handles 3 are again in the position shown in FIG. 1, the bolts 6 which are spring loaded engage automatically in the holes 6a in the frame 5 so that the handles become fixed in place. The wheelbarrow is then able to be used as a conventional barrow and can be lifted by the handles 3 to carry the load material to the required site and then empty the load material from the bin by tipping the material over the front wheel of the barrow as wheelbarrows are usually emptied. Fragile material, such as paving stones, can readily be unloaded from the wheelbarrow without damage by going through the movements that are used for loading the barrow to unload at ground level.

In an alternative embodiment which is not shown in the drawing, the rear edge of the bin 1 carries a loose flap which is fastened by a hinge along the length of the rear edge. When the rear edge is brought adjacent the ground surface, the flap falls down to rest on the ground so that any gap that might occur between the ground surface and the rear edge of the bin is closed by the flap which in this position acts as a ramp to facilitate the operation of pushing material onto the bin.

Figure 4:
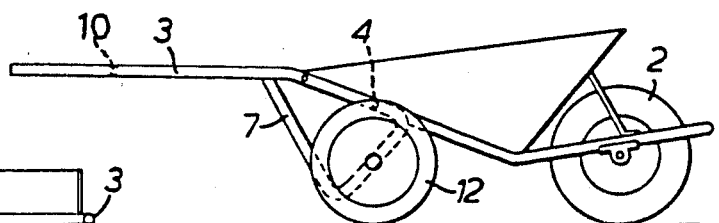
FIG. 4 is a similar view of a second embodiment.

FIG. 4 shows a second embodiment in which part of each loop portion 7 which is joined to the handle 3 is replaced by a secondary wheel 12. The secondary wheel 12 thus replaces the curved part of the loop portion 7 and the portion 7 is a triangular shape with a mounting point for the wheel 12 being located on one of the sides of the triangle. A different view of this embodiment is given in FIG. 5 which is an end view taken from the left hand side of FIG. 4. The wheelbarrow of FIGS. 4 and 5 can move for at least short distances without any lifting of the bin being necessary after the handles are restored to the working condition, and thus it is suitable for carrying particularly heavy loads.

Figure 5:
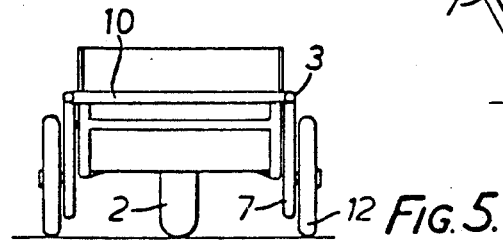
FIG. 5 is an end view of the wheelbarrow of FIG. 4.

FIGS. 4 and 5 show that the two handles 3 are connected together by a horizontal member 10 which is welded to both handles to ensure a strong linkage. The purpose of the member 10 is to ensure that both handles 3 will move simultaneously if the user is standing at the side of the wheelbarrow and is able to reach only one of the handles 3 at one time. In use of the wheelbarrow it has been found to be convenient for the loading operation if the user is standing at one side of the barrow and he can then take one or two paces in the direction of the movement when the handle 3 is pulled over.

It is not essential that the member 10 should be located in the position depicted in FIG. 4—this position might not be convenient if a load having a substantial vertical height above the rim of the bin is to be carried. An alternative position for the member 10 would be, in the FIG. 3 view, just below the roller 8 since the handles can then be joined together with adequate stiffness and there is then nothing to obstruct the space above the bin 1.

The foregoing description of embodiments of the invention has been given by way of example only and a number of modifications may be made without departing from the scope of the invention as defined in the accompanying claims. For instance, the single wheel at the front end of the wheelbarrow might be replaced by two wheels located on one axis and possibly the front wheel or wheels could be provided with a motor to give some mechanical assistance in the movement of material with the wheelbarrow.

Although the wheelbarrow has been described particularly for use in the garden, it is clear that it will have many other uses such as in industry, on building sites and in the laying of pavements. Since many workers in these occupations eventually suffer from strains in the lower part of the back the possibility offered by the wheelbarrow of the invention in reducing the manual effort needed for loading can help to combat fatigue and contribute to industrial safety.

The possibility of using the wheelbarrow as a wide scoop mounted on wheels is an additional operational benefit for which one would formerly have had to provide a separate scooping tool. In the garden, the scoop can be used for picking up fallen leaves or grass cuttings etc. and in winter it can be used in a snow clearing operation since the scooping action enables a layer of fallen snow to be readily picked up from a footpath surface. With a full load of snow and the handles restored to the wheelbarrow working position, the snow may be carried to the side of the footpath and then tipped out in a place where the snow residues are unlikely to be a danger to pedestrians or vehicles. Many of the snow clearing tools currently available have no provision for carrying the removed volume of snow to the side of a path where it can be allowed to melt without causing further inconvenience.

I claim:

1. A wheelbarrow comprising:
   a bin for a load;
   a ground wheel disposed at a front end of said bin;
   two handles disposed at a rear end of said bin, each said handle being rigidly connected to the other handle and having a hand engageable end and an inner end;
   an eccentric-shaped leg means rigidly attached to said inner end of each said handle and pivotably attached to said bin near the rear end of said bin through pivots so that pivotal movement of said handles causes pivotal movement of said eccentric-shaped leg means, said eccentric-shape being in a plane perpendicular to a pivot axis which passes through said pivots;

said handles and said eccentric-shaped leg means being pivotable between a first position in which said handles extend in a direction away from said front end of said bin, said eccentric-shaped leg means are in a position to raise said rear end of said bin above the ground, and said wheelbarrow is in a position for transport, and a second position in which said handles extend in a direction towards said front end of said bin, said eccentric-shaped leg means are in a position to lower said rear end of said bin toward the ground, and said wheelbarrow is in a position for loading and unloading; and a roller disposed at said rear end of said bin, said roller supporting said rear end of said bin in rolling contact with the ground when said wheelbarrow is in said second position.

2. A wheelbarrow according to claim 1 further comprising a frame for supporting said bin and said ground wheel, said handles and said eccentric-shaped leg means being pivotably attached to said bin through said frame.

3. A wheelbarrow according to claim 2 wherein said handles and said eccentric-shaped leg means are securable in said first position by a releasable lock.

4. A wheelbarrow according to claim 3 wherein said releasable lock comprises a pin capable of passing through a receiving hole in said frame.

5. A wheelbarrow according to claim 4 wherein said pin is attached to said eccentric-shaped leg means.

6. A wheelbarrow according to claim 1 wherein said eccentric-shaped leg means comprises a secondary wheel positioned to support said rear end of said bin.

7. A wheelbarrow according to claim 1 wherein during said pivoting of said handles and said eccentric-shaped leg means between said first and second positions, the periphery of said eccentric-shaped leg means is in constant, continuous rolling contact with the ground surface to cause a steady, controllable lifting force to develop in said handles, the lifting force being controllable throughout the entire range of movement of said handles and said eccentric-shaped leg means.

8. A wheelbarrow according to claim 1 wherein said eccentric-shaped leg means are tear-shaped.

* * * * *